(12) United States Patent
Su et al.

(10) Patent No.: US 9,999,997 B2
(45) Date of Patent: Jun. 19, 2018

(54) METAL-PLASTIC COMPOSITE AND METHOD FOR PRODUCING THE SAME

(71) Applicant: BYD COMPANY LIMITED, Guangdong (CN)

(72) Inventors: Shijin Su, Guangdong (CN); Lihong Zhao, Guangdong (CN); Wenhai Luo, Guangdong (CN)

(73) Assignee: BYD COMPANY LIMITED, Shenzhen (CN)

( * ) Notice: Subject to any disclaimer, the term of this patent is extended or adjusted under 35 U.S.C. 154(b) by 49 days.

(21) Appl. No.: 15/184,826

(22) Filed: Jun. 16, 2016

(65) Prior Publication Data

US 2016/0297124 A1  Oct. 13, 2016

Related U.S. Application Data

(63) Continuation of application No. PCT/CN2014/095810, filed on Dec. 31, 2014.

(30) Foreign Application Priority Data

Dec. 31, 2013  (CN) .......................... 2013 1 0750817

(51) Int. Cl.
| | | |
|---|---|---|
| *B29C 45/14* | (2006.01) | |
| *B23K 26/0622* | (2014.01) | |
| *B23K 26/70* | (2014.01) | |
| *B23K 26/34* | (2014.01) | |
| *B29K 705/00* | (2006.01) | |
| *B23K 101/34* | (2006.01) | |
| *B29K 101/12* | (2006.01) | |

(52) U.S. Cl.
CPC .... *B29C 45/14311* (2013.01); *B23K 26/0622* (2015.10); *B23K 26/34* (2013.01); *B23K 26/70* (2015.10); *B29C 45/14811* (2013.01); *B23K 2201/34* (2013.01); *B29K 2101/12* (2013.01); *B29K 2705/00* (2013.01)

(58) Field of Classification Search
CPC .................................................. B23K 2201/34
USPC ......................................................... 428/100
See application file for complete search history.

(56) References Cited

U.S. PATENT DOCUMENTS

| 4,040,981 A | 8/1977 | Inaba et al. |
| 4,154,705 A | 5/1979 | Baldi |

(Continued)

FOREIGN PATENT DOCUMENTS

| EP | 1643546 | 4/2006 |
| EP | 1958763 | 8/2008 |

(Continued)

OTHER PUBLICATIONS

Final Office Action for U.S. Appl. No. 14/466,932, dated Jan. 20, 2017, 15 pages.

(Continued)

*Primary Examiner* — Brent T O'Hern

(57) ABSTRACT

A metal-plastic composite and method for producing the same are provided. The metal-plastic composite comprises: a metal substrate and a plastic body jointed to the metal substrate via a dual-snap-fit structure, in which the dual-snap-fit structure comprises: a micro-snap-fit structure disposed on the metal substrate and a macro-snap-fit structure formed by the micro-snap-fit structure and a surface of the metal substrate.

18 Claims, 1 Drawing Sheet

(56) References Cited

U.S. PATENT DOCUMENTS

| | | |
|---|---|---|
| 4,179,412 A | 12/1979 | Inaba et al. |
| 4,499,237 A | 2/1985 | Tracke |
| 4,687,551 A | 8/1987 | Furneaux et al. |
| 5,021,504 A | 6/1991 | Fujita |
| 5,332,780 A | 7/1994 | Kitazawa et al. |
| 5,602,200 A | 2/1997 | Wissmann |
| 5,951,747 A | 9/1999 | Lewis |
| 6,495,225 B1 | 12/2002 | Nakajima et al. |
| 6,804,081 B2 | 10/2004 | Den et al. |
| 7,841,577 B2 | 11/2010 | Yamaguchi et al. |
| 7,879,734 B2 | 2/2011 | Fukutani et al. |
| 8,703,272 B2 | 4/2014 | Naritomi et al. |
| 2001/0036559 A1 | 11/2001 | Ulrich et al. |
| 2002/0033108 A1 | 3/2002 | Akiyama et al. |
| 2002/0040888 A1 | 4/2002 | Marczak et al. |
| 2003/0001274 A1 | 1/2003 | Den et al. |
| 2003/0180555 A1 | 9/2003 | Wakayama et al. |
| 2004/0013931 A1 | 1/2004 | Takamura et al. |
| 2004/0062943 A1 | 4/2004 | Naritomi et al. |
| 2004/0142503 A1 | 7/2004 | Lee et al. |
| 2004/0229031 A1 | 11/2004 | Gell et al. |
| 2006/0046602 A1 | 3/2006 | Kang |
| 2006/0054589 A1 | 3/2006 | Omori et al. |
| 2006/0055084 A1 | 3/2006 | Yamaguchi et al. |
| 2006/0057492 A1 | 3/2006 | Kunita |
| 2006/0088680 A1 | 4/2006 | Kitahara |
| 2006/0127684 A1 | 6/2006 | Naritomi et al. |
| 2006/0257624 A1 | 11/2006 | Naritomi et al. |
| 2007/0096359 A1 | 5/2007 | Torfs |
| 2007/0116934 A1 | 5/2007 | Miller |
| 2007/0196637 A1 | 8/2007 | Good et al. |
| 2008/0041257 A1 | 2/2008 | Teng |
| 2008/0057336 A1 | 3/2008 | Kurokawa et al. |
| 2008/0070152 A1 | 3/2008 | Tu |
| 2008/0081867 A1 | 4/2008 | Sakata et al. |
| 2008/0102404 A1 | 5/2008 | Tashiro et al. |
| 2009/0017242 A1 | 1/2009 | Weber et al. |
| 2009/0075156 A1 | 3/2009 | Long et al. |
| 2009/0155522 A1 | 6/2009 | Raghavendran |
| 2009/0202840 A1 | 8/2009 | Griebel et al. |
| 2009/0274889 A1 | 11/2009 | Iwahashi et al. |
| 2009/0280296 A1 | 11/2009 | Naritomi et al. |
| 2009/0304970 A1 | 12/2009 | Imaizumi et al. |
| 2010/0018025 A1 | 1/2010 | Naritomi et al. |
| 2010/0021718 A1 | 1/2010 | Vos et al. |
| 2010/0028602 A1 | 2/2010 | Naritomi et al. |
| 2010/0150826 A1 | 6/2010 | Troczynski et al. |
| 2010/0177392 A1 | 7/2010 | Masuda et al. |
| 2010/0189958 A1 | 7/2010 | Naritomi et al. |
| 2010/0190029 A1 | 7/2010 | Ueki |
| 2010/0215965 A1 | 8/2010 | Tadaki |
| 2010/0218827 A1 | 9/2010 | Aono et al. |
| 2010/0255732 A1 | 10/2010 | Kohmura et al. |
| 2010/0283165 A1 | 11/2010 | Ihara |
| 2010/0304083 A1 | 12/2010 | Naritomi et al. |
| 2010/0316878 A1 | 12/2010 | Naritomi et al. |
| 2010/0319757 A1 | 12/2010 | Oetting |
| 2011/0008644 A1 | 1/2011 | Naritomi et al. |
| 2011/0111214 A1 | 5/2011 | Endo et al. |
| 2011/0165342 A1 | 7/2011 | Imai et al. |
| 2011/0250377 A1 | 10/2011 | Qin |
| 2011/0281135 A1 | 11/2011 | Gong et al. |
| 2011/0297549 A1 | 12/2011 | Chen et al. |
| 2011/0300400 A1 | 12/2011 | Tomita et al. |
| 2011/0305893 A1 | 12/2011 | Chang et al. |
| 2011/0318585 A1 | 12/2011 | Su et al. |
| 2012/0015186 A1 | 1/2012 | Honma et al. |
| 2012/0039066 A1 | 2/2012 | Hatanaka et al. |
| 2012/0043689 A1 | 2/2012 | Chang et al. |
| 2012/0094108 A1 | 4/2012 | Chang et al. |
| 2012/0168990 A1 | 7/2012 | Kuwahara et al. |
| 2012/0213971 A1 | 8/2012 | Ihara |
| 2012/0237755 A1 | 9/2012 | Chang et al. |
| 2013/0043689 A1 | 2/2013 | Tai et al. |
| 2013/0052582 A1 | 2/2013 | Hayashi |
| 2013/0078423 A1 | 3/2013 | Sutou et al. |
| 2013/0171509 A1 | 7/2013 | Chao |
| 2013/0242487 A1 | 9/2013 | Fujioka et al. |
| 2014/0360974 A1 | 12/2014 | Sun et al. |
| 2014/0363623 A1 | 12/2014 | Sun et al. |
| 2014/0363631 A1 | 12/2014 | Gong et al. |
| 2014/0363657 A1 | 12/2014 | Gong et al. |
| 2014/0363658 A1 | 12/2014 | Sun et al. |
| 2014/0363659 A1 | 12/2014 | Sun et al. |
| 2014/0363660 A1 | 12/2014 | Gong et al. |
| 2014/0363686 A1 | 12/2014 | Sun et al. |

FOREIGN PATENT DOCUMENTS

| | | |
|---|---|---|
| EP | 2031099 | 3/2009 |
| EP | 2154203 | 2/2010 |
| EP | 2221398 | 8/2010 |
| EP | 2426237 | 3/2012 |
| EP | 2574441 A1 | 4/2013 |
| JP | 02308555 A * | 12/1990 |
| JP | 2308555 A | 12/1990 |
| JP | 2007-016123 | 1/2007 |
| JP | 2006124827 A | 5/2008 |
| WO | 0138444 | 5/2001 |
| WO | 2004048087 | 6/2004 |
| WO | 2005109984 | 11/2005 |
| WO | 2007066742 | 6/2007 |
| WO | 2009078377 | 6/2009 |
| WO | 2010073636 | 7/2010 |
| WO | 2011055757 | 5/2011 |
| WO | 2011071102 | 6/2011 |
| WO | 2011123790 | 10/2011 |
| WO | 2013123754 | 8/2013 |
| WO | 2013123756 | 8/2013 |
| WO | 2013123769 | 8/2013 |
| WO | 2013123770 | 8/2013 |
| WO | 2013123771 | 8/2013 |
| WO | 2013123772 | 8/2013 |
| WO | 2013123773 | 8/2013 |
| WO | 2013123898 | 8/2013 |
| WO | 2013/148476 A1 | 10/2013 |
| WO | 2013148476 | 10/2013 |
| WO | 2013178057 | 12/2013 |
| WO | 2014101778 | 7/2014 |

OTHER PUBLICATIONS

Final Office Action for U.S. Appl. No. 14/466,873, dated Feb. 16, 2017, 16 pages.
Final Office Action for U.S. Appl. No. 14/466,920, dated Feb. 16, 2017, 15 pages.
Final Office Action for U.S. Appl. No. 14/466,937, dated Feb. 17, 2017, 14 pages.
Non-Final Office Action for U.S. Appl. No. 14/466,927, dated Feb. 21, 2017, 21 pages.
Final Office Action for U.S. Appl. No. 14/466,853, dated Mar. 13, 2017, 15 pages.
Final Office Action for U.S. Appl. No. 14/466,363, dated Mar. 29, 2017, 15 pages.
Non-Final Office Action for U.S. Appl. No. 14/466,932, dated Apr. 28, 2017, 25 pages.
Non-Final Office Action for U.S. Appl. No. 14/723,344, dated Jun. 8, 2017, 15 pages.
Non-Final Office Action for U.S. Appl. No. 14/466,363, dated Oct. 18, 2016 (12 pages).
International Search Report and Written Opinion for PCT/CN2014/095810, dated Apr. 1, 2015, 12 pages.
Fumeaux et al., "The Formation of Controlled-porosity Membranes from Anodically Oxidized Aluminum," Nature, vol. 337, No. 6203, Jan. 12, 1989, pp. 147149.
Gong et al., "Electrochemical/chemical Synthesis of Nanostructured Arrays of Oxide Cones or Rings," Journal of Materials Chemistry. vol. 18, No. 15, Mar. 12, 2008, pp. 1741-1746.
Lee et al., "NanostructureDependent WaterDroplet Adhesiveness Change in Superhydrophobic Anodic Aluminum Oxide Surfaces:

(56) References Cited

OTHER PUBLICATIONS

From Highly Adhesive to Self-Cleanable," Langmuir Letter, vol. 26, No. 3, Feb. 2, 2010, pp. 1412-1415, including Supporting Information, Dec. 29, 2009.
Extended European Search Report dated Sep. 25, 2015, issued in related European Patent Application No. EP 12869418.9 (7 pages).
Extended European Search Report dated Sep. 25, 2015, issued in related European Patent Application No. EP12869214.2 (6 pages).
PCT International Preliminary Report on Patentability dated Aug. 26, 2014, issued in related International Application No. PCT/CN2012/078830 (5 pages).
PCT International Preliminary Report on Patentability dated Aug. 26, 2014, issued in related International Application No. PCT/CN2012/078832 (5 pages).
International Preliminary Report on Patentability dated Aug. 26, 2014, i ssued in related International Application No. PCT/CN2012/082025 (5 pages).
PCT International Preliminary Report on Patentability dated Aug. 26, 2014, issued in related International Application No. PCT/CN2012/082029 (5 pages).
PCT International Preliminary Report on Patentability dated Aug. 26, 2014, issued in related International Application No. PCT/CN2012/082043 (5 pages).
PCT International Preliminary Report on Patentability dated Aug. 26, 2014, issued in related International Application No. PCT/CN2013/071797 (7 pages).
PCT International Preliminary Report on Patentability dated Aug. 26, 2014. issued in related International Application No. PCT/CN2012/082031 (5 pages).
PCT International Search Report and Written Opinion dated Mar. 27, 2014, issued in related International Application No. PCT/CN2013/090471 (13 pages).
PCT International Search Report and Written Opinion dated Sep. 5, 2013, issued in related International Application No. PCT/CN2013/076351 (12 pages).
PCT International Search Report dated Dec. 13, 2012, issued in International Application No. PCT/CN2012/078832 (4 pages).
PCT International Search Report dated Jan. 10, 2013, issued in International Application No. PCT/CN2012/082043 (4 pages).
PCT International Search Report dated Jan. 3, 2013, issued in International Application No. PCT/CN2012/082025 (4 pages).
PCT International Search Report dated Jan. 3, 2013, issued in International Application No. PCT/CN2012/082029 (4 pages).
PCT International Search Report dated Jan. 3, 2013, issued in International Application No. PCT/CN2012/082031 (4 pages).
PCT International Search Report dated Jan. 3, 2013, issued in International Application No. PCT/CN2012/082036 (4 pages).
PCT International Search Report dated May 30, 2013, issued in International Application No. PCT/CN2013/071797 (4 pages).
PCT International Search Report dated Nov. 29, 2012, issued in International ApplicationNo. PCT/CN2012/078830 (4 pages).
Non-Final Office Action dated May 24, 2016, issued in related U.S. Appl. No. 14/466,906 (11 pages).
Non-Final Office Action dated Aug. 17, 2016, issued in related U.S. Appl. No. 14/466,873 (15 pages).
Non-Final Office Action dated Aug. 1, 2016, issued in related U.S. Appl. No. 14/466,920 (12 pages).
Final Office Action dated Jul. 21, 2016, issued in related U.S. Appl. No. 14/466,927 (13 pages).
Non-Final Office Action dated Feb. 18, 2016, issued in related U.S. Appl. No. 14/466,927 (15 pages).
Final Office Action dated Jun. 20, 2016, issued in related U.S. Appl. No. 14/466,932 (10 pages).
Non-Final Office Action dated Apr. 8, 2016, issued in related U.S. Appl. No. 14/466,932 (9 pages).
Non-Final Office Action dated Aug. 3, 2016, issued in related U.S. Appl. No. 14/466,937 (14 pages).
Non-Final Office Action dated Sep. 30, 2016, issued in related U.S. Appl. No. 14/466,853 (12 pages).
Non-Final Office Action dated Sep. 20, 2016, issued in related U.S. Appl. No. 14/466,932 (17 pages).
Final Office Action for U.S. Appl. No. 14/466,906, dated Nov. 9, 2016, 13 pages.
Non-Final Office Action for U.S. Appl. No. 14/554,370, dated Feb. 2, 2017, 10 pages.
Final Office Action for U.S. Appl. No. 14/723,344, dated Dec. 6, 2017, 16 pages.
Lefebvre, L. et al., "Porous Metals and Metallic Foams: Curent Status and Recent Developments," Advanced Engineering Materials, 2008, vol. 10, No. 9, p. 775-787.
Final Office Action for U.S. Appl. No. 14/466,927, dated Jul. 17, 2017, 21 pages.
Final Office Action for U.S. Appl. No. 14/466,932, dated Sep. 1, 2017, 12 pages.
Schneider, Marcel F., "Laser Cladding with Powder," Thesis University of Twente, Enschede, Mar. 1998, 178 pages.

\* cited by examiner

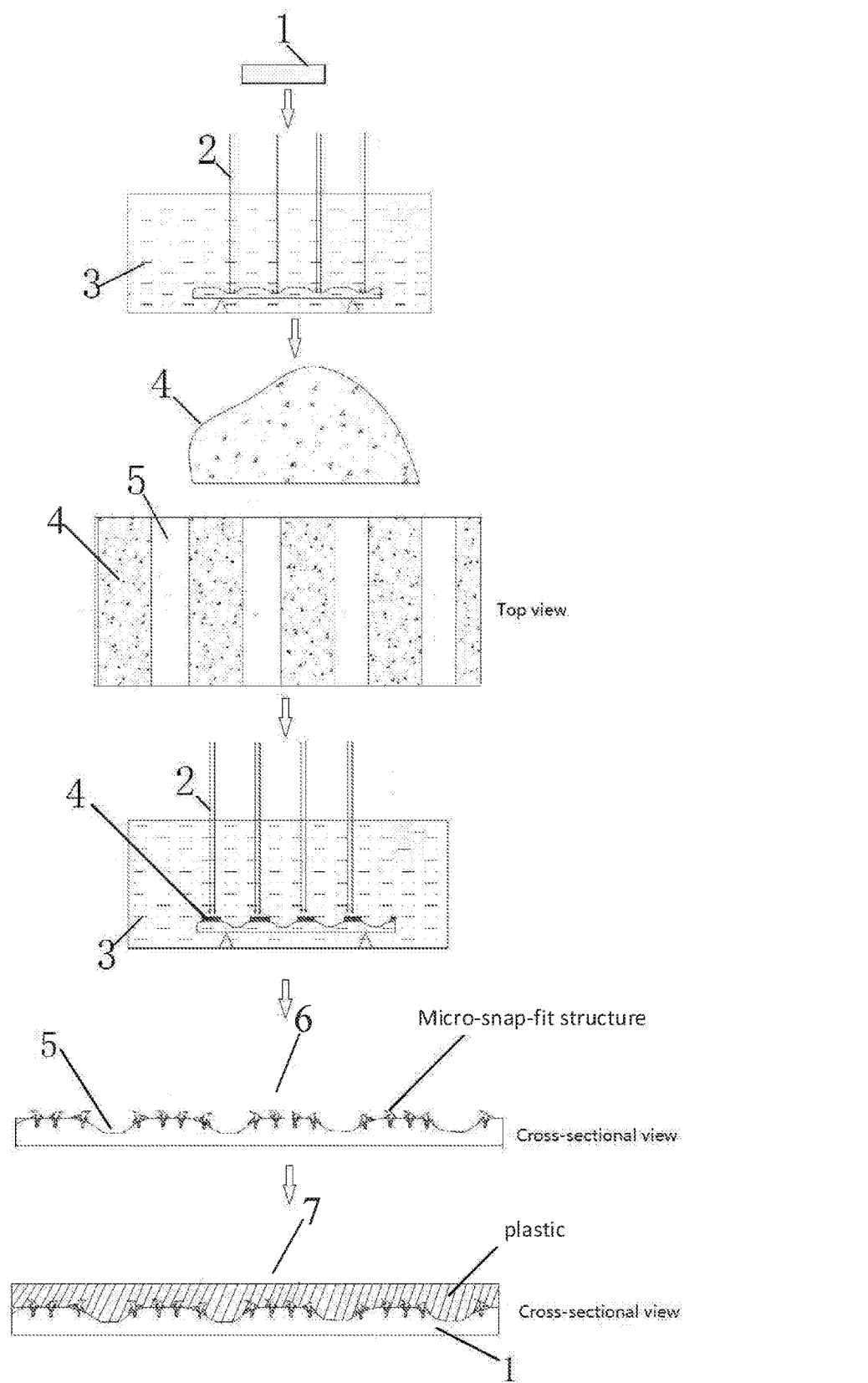

METAL-PLASTIC COMPOSITE AND METHOD FOR PRODUCING THE SAME

CROSS-REFERENCE TO RELATED APPLICATION

This application is a continuation application of International Application No. PCT/CN2014/095810, filed on Dec. 31, 2014, which is based on and claims priority to and benefits of Chinese Patent Application Serial No. 201310750817.6, filed with the State Intellectual Property Office of P. R. China on Dec. 31, 2013. The entire contents of the above-referenced applications are incorporated herein by reference.

FIELD

The present disclosure relates to the field of metal-plastic integrally molding, and more particularly, to a method for producing a composite of a metal and a plastic, and a metal-plastic composite obtainable by the same.

BACKGROUND

Currently, a metal substrate may be joined with a plastic through the following three methods:

(a) using an adhesive to join a metal substrate with a formed plastic;
(b) improving the characteristics of a plastic; or
(c) forming holes on a surface of a metal substrate by electro-chemical etching treatment, and injection molding a plastic on the surface of the metal substrate to join the metal substrate with the plastic.

However, all of the above methods have their shortcomings. For example, using an adhesive to join the metal substrate and the resin will cause poor adhesion force, poor resistance to acid or alkali, and the thickness of the adhesive will affect the size of the final product.

A better method for producing a metal-plastic composite is desired.

SUMMARY

Embodiments of the present disclosure seek to solve at least one of the problems existing in the prior art to at least some extent.

According to a first broad aspect of present disclosure, a metal-plastic composite is provided. The metal-plastic comprises: a metal substrate; and a plastic body jointed to the metal substrate via a dual-snap-fit structure, wherein the dual-snap-fit structure comprises: a micro-snap-fit structure disposed on the metal substrate; and a macro-snap-fit structure formed by the micro-snap-fit structure and a surface of the metal substrate. A dual-snap-fit structure may significantly improve the adhesion force between a metal substrate and plastic in a metal-plastic composite.

According to a second aspect of present disclosure, a method for producing a metal-plastic composite is provided. The method comprises steps of: forming grooves in a metal substrate; providing a melt composition on at least a part of a surface of the metal substrate, joining the metal substrate with at least a part of the melt composition on a surface between neighboring grooves of the metal substrate via laser cladding under a first protective atmosphere, and cooling to room temperature; removing the melt composition not joining with the metal substrate, to obtain a metal body; and injection molding a plastic on the surface of the metal body, to obtain the metal-plastic composite, wherein the melt composition comprises $SiO_2$ and a metal base powder.

The grooves may be formed by laser irradiating the surface of the metal substrate under protective atmosphere, and then a melt composition comprising $SiO_2$ and a metal base powder may be coated on at least a part of the surface of the metal substrate. The melt composition may be combined with the metal substrate via laser cladding, that is, the melt composition and the metal substrate may be melted when irradiated by a laser, the melted melt composition and the melted metal substrate may be joined with each other, therefore a micro-snap-fit structure similar to a dove-tail slot may be formed between the neighboring grooves on the surface of the metal substrate, and then a macro-snap-fit structure may be formed by the micro-snap-fit structure and a surface of the metal substrate, especially formed by the micro-snap-fit structure and the groove on the surface of the metal substrate. After cooling and removing the remaining melt composition not joining with the metal substrate, a metal body may be formed. A metal-plastic composite may be formed after injection molding plastic resin. The resulting metal-plastic composite comprises a dual-snap-fit structure, which will significantly improve the adhesion force between the metal substrate and the plastic.

The method of present disclosure is easy to process with low cost, and the resulting metal-plastic composite may achieve an adhesion force of up to about 15 to about 25 MPa, demonstrating a high joining strength between the metal substrate and plastic.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWING

The disclosure is illustrated with the accompanying drawings, in which:

FIG. 1 shows a schematic view of a method for producing a metal-plastic composite according to one embodiment of present disclosure.

Reference numerals: 1 metal substrate; 2 laser; 3 protective gas; 4 melt composition; 5 through groove; 6 metal body; 7 metal-plastic composite.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

According to a first broad aspect of present disclosure, a metal-plastic composite is provided. According to embodiments of present disclosure, the metal-plastic composite comprises a metal substrate, and a plastic body jointed to the metal substrate via a dual-snap-fit structure, in which the dual-snap-fit structure comprises: a micro-snap-fit structure disposed on the metal substrate, and a macro-snap-fit structure formed by the micro-snap-fit structure and a surface of the metal substrate.

A dual-snap-fit structure may significantly improve the adhesion force between a metal substrate and a plastic in a metal-plastic composite, and the metal-plastic may achieve an adhesion force of up to about 15 to about 25 MPa, demonstrating a high joining strength between the metal substrate and plastic.

According to embodiments of present disclosure, the metal substrate may have a rugged surface, and the adhesion force or joining strength between the metal substrate and plastic may be further improved.

According to embodiments of present disclosure, the micro-snap-fit structure may be any conventional hook for further strengthening the high joining strength between the metal substrate and plastic. According to embodiments of present disclosure, a groove is formed in the surface of the metal substrate. The dual-snap-fit structure may comprise the micro-snap-fit structure and the macro-snap-fit structure formed by the micro-snap-fit structure and the groove. According to embodiments of present disclosure, as shown in FIG. 1, the groove is configured as a through groove, and the micro-snap-fit structure may be formed between neighboring through groove 5 on the metal substrate 1. Thus, the adhesion force or joining strength between the metal substrate and plastic may be further improved.

According to embodiments of present disclosure, the through groove has a width of about 0.1 to 0.5 mm. Preferably, according to embodiments of present disclosure, the through groove has a width of about 0.2 to 0.4 mm. According to embodiments of present disclosure, the through groove has a depth of about 0.3 to 0.7 mm. Preferably, the through groove has a depth of about 0.4 to 0.6 mm. According to embodiments of present disclosure, multiple through grooves are formed on the surface of the metal substrate, and the through grooves have a spacing distance of about 0.5 to 1.0 mm. Preferably, the through grooves have a spacing distance of about 0.6 to 0.8 mm. According to embodiments of present disclosure, the micro-snap-fit structure is configured as a hook-structure formed by laser cladding a melt composition on the metal substrate.

According to embodiments of present disclosure, the micro-snap-fit structure is made of a melt composition comprising $SiO_2$ and a metal base powder. According to embodiments of present disclosure, $SiO_2$ may be provided in a form of a mixture containing $SiO_2$, which may be high temperature-resistant and difficult to crack. Preferably, $SiO_2$ may be provided in a form of quartz sand containing $SiO_2$, which will lower the cost. More preferably, the quartz sand may have an average diameter of 100 to 1000 microns, and $SiO_2$ content of the quartz sand may be 90 to 99 wt %. According to embodiments of present disclosure, based on total weight of the melt composition, $SiO_2$ has a content of about 30 to 50 wt %. Preferably, based on total weight of the melt composition, $SiO_2$ has a content of about 35 to 45 wt %.

There is no specific limit to the type of the metal base powder. Preferably the metal base powder is of same type with the metal substrate. According to embodiments of present disclosure, based on total weight of the melt composition, the metal base powder has a content of about 50 to 70 wt %. Preferably, based on total weight of the melt composition, the metal base powder has a content of about 55 to 65 wt %. There is no specific limit to the particle size of the metal base powder. According to embodiments of present disclosure, the metal base powder has an average diameter of about 10 to about 80 microns. Preferably, the metal base powder has an average diameter of about 30 to about 60 microns. Preferably, the micro-snap-fit structure has a thickness of 100-1000 microns.

According to embodiments of present disclosure, the plastic body may be of any conventional plastic. Preferably, the plastic body may be at least one of PE (Poly ethylene), PP (Polypropylene), PVC (Polyvinyl chloride) and PPS (Polyphenyl sulfide). According to embodiments of present disclosure, the metal substrate may be any conventional metal, as long as the metal may be melted by a laser irradiation. Preferably, the metal may be at least one of Fe, Mg and Al or alloy thereof.

According to a second aspect of present disclosure, there is provided a method for producing a metal-plastic composite. Referring to FIG. 1, the method comprises steps of:

forming grooves in a metal substrate 1;

providing a melt composition 4 comprising $SiO_2$ and a metal base powder on at least a part of a surface of the metal substrate 1;

joining the metal substrate 1 with at least a part of the melt composition 4 on a surface between neighboring grooves of the metal substrate 1 via laser cladding under a first protective atmosphere 3, and cooling to room temperature;

removing the melt composition 4 not joining with the metal substrate 1, to obtain a metal body 6; and injection molding a plastic on the surface of the metal body 6, to obtain the metal-plastic composite 7.

The grooves may be formed by laser irradiating the surface of the metal substrate under a second protective atmosphere. According to embodiments of the present disclosure, the laser irradiating is performed under the following conditions: laser power of about 10 to 30 W; laser pulse width of at least 10 ns; and laser wave length of about 760 nm to about 1064 nm. A melt composition comprising $SiO_2$ and metal base powder may be coated on at least a part of the surface of the metal substrate. The melt composition may be then irradiated by laser to be joined with the metal substrate, and a micro-snap-fit structure similar to a dovetail slot may be formed between the neighboring grooves on the surface of the metal substrate, and then a macro-snap-fit structure may be formed by the micro-snap-fit structure and a surface of the metal substrate, especially formed by the micro-snap-fit structure and the groove on the surface of the metal substrate. After cooling and removing the remaining melt composition not joining with the metal substrate, a metal body may be formed. Thus, a metal-plastic composite may be formed after injection molding plastic resin. The resulting metal-plastic composite comprises a dual-snap-fit structure, which will significantly improve the adhesion force between the metal substrate and the plastic.

The method of present disclosure is easy to process with low cost, and the resulting metal-resin composite may achieve an adhesion force of up to about 15 to about 25 MPa, demonstrating a high joining strength between the metal substrate and plastic.

According to embodiments of present disclosure, the metal substrate may have a rugged surface. Thus, the adhesion force or joining strength between the metal substrate and plastic may be further improved.

According to embodiments of present disclosure, the micro-snap-fit structure may be any conventional hook to further strengthen the high joining strength between the metal substrate and plastic. According to embodiments of present disclosure, a groove is formed in the surface of the metal substrate, the dual-snap-fit structure comprises the micro-snap-fit structure and the macro-snap-fit structure formed by the micro-snap-fit structure and the groove, and the adhesion force between the metal substrate and plastic may be further improved. According to embodiments of present disclosure, as shown in FIG. 1, the groove is configured as a through groove, and the micro-snap-fit structure may be formed between neighboring through groove 5 on the metal substrate 1.

The configuration size of the through groove may be any conventional configuration size. According to embodiments of present disclosure, the through groove has a width of about 0.1 to 0.5 mm. Preferably, according to embodiments of present disclosure, the through groove has a width of about 0.2 to 0.4 mm. According to embodiments of present disclosure, the through groove has a depth of about 0.3 to 0.7 mm. Preferably, the through groove has a depth of about 0.4 to 0.6 mm. According to embodiments of present disclosure, multiple through grooves are formed on the surface of the metal substrate, and the through grooves have a spacing distance of about 0.5 to 1.0 mm. Preferably, the through grooves have a spacing distance of about 0.6 to 0.8 mm. According to embodiments of present disclosure, the micro-snap-fit structure is configured as a hook-structure formed by laser-cladding a melt composition on the metal substrate. Thus, the adhesion force or joining strength between the metal substrate and plastic may be further improved.

According to embodiments of present disclosure, the micro-snap-fit structure is made of a melt composition comprising $SiO_2$ and a metal base powder. According to embodiments of present disclosure, $SiO_2$ may be provided in a form of a mixture containing $SiO_2$, which may be high temperature-resistant and difficult to crack. Preferably, $SiO_2$ may be provided in a form of quartz sand containing $SiO_2$, which will lower the cost. More preferably, the quartz sand may have an average diameter of 100 to 1000 microns, and $SiO_2$ content of the quartz sand may be 90 to 99 wt %. According to embodiments of present disclosure, based on total weight of the melt composition, $SiO_2$ has a content of about 30 to 50 wt %. Preferably, based on total weight of the melt composition, $SiO_2$ has a content of about 35 to 45 wt %.

There is no specific limit to the type of the metal base powder. Preferably, the metal base powder is of the same type as the metal substrate. According to embodiments of present disclosure, based on total weight of the melt composition, the metal base powder has a content of about 50 to 70 wt %. Preferably, based on total weight of the melt composition, the metal base powder has a content of about 55 to 65 wt %. There is no specific limit to the particle size of the metal base powder. According to embodiments of present disclosure, the metal base powder has an average diameter of about 10 to about 80 microns. Preferably, the metal base powder has an average diameter of about 30 to about 60 microns. Preferably, the melt composition has a thickness of 100-1000 microns.

According to embodiments of present disclosure, the plastic body may be of any conventional plastic. Preferably, the injection-molded plastic body may be at least one of PE (Poly ethylene), PP (Polypropylene), PVC (Polyvinyl chloride) and PPS (Polyphenyl sulfide). According to embodiments of present disclosure, the metal substrate may be any conventional metal, as long as the metal may be melted by a laser irradiation. Preferably, the metal may be at least one of Fe, Mg and Al or alloy thereof.

According to embodiments of present disclosure, the laser cladding is performed under the following conditions: laser power of about 10 to 30 W; laser pulse width of at least 10 ns; and laser wave length of about 760 nm to about 1064 nm. Preferably, the laser may be provided by YGA metal laser cutting machine. Thus, the dual-snap-fit structure may be stronger and the adhesion force or joining strength between the metal substrate and plastic may be further improved.

According to embodiments of present disclosure, the first and second protective atmospheres are respectively independently formed by at least one gas of $N_2$, He, Ne, Ar, Kr, Xe, and Rn. A skilled person in the art should understand that the protective atmosphere should be provided before the laser irradiation.

According to embodiments of present disclosure, there is no specific limit to the orientation of the laser 2. Preferably, the orientation of the laser 2 is perpendicular to the metal substrate 1.

According to embodiments of present disclosure, the melt composition may be coated on entire or a part of the surface of the metal substrate. Preferably, the melt composition is coated on entire surface of the metal substrate. Thus, the method of present disclosure is easy to process.

According to embodiments of present disclosure, the method of removing the melt composition not joining with the metal substrate may be any of conventional removal method. Preferably, the melt composition not joining with the metal substrate may be removed by using a dust removal air gun or a brush.

According to embodiments of present disclosure, the method of injection molding may be any of conventional injection molding methods. Preferably, the method of injection molding may be point into the plastic. The point into the plastic injection molding comprising steps of: the metal body 6 may be placed in a injection mold, and 100-200 g melt plastic with temperature of from 300° C. to 320° C. may be injected on the surface of the metal body, maintaining for from 1 second to 2 seconds under the pressure of from 500 kg/m2 to 1000 kg/m2 and cooling to room temperature, to obtain the metal-plastic composite.

According to an optimal embodiment of present disclosure, as shown in FIG. 1, the method for producing the metal-plastic composite, comprising steps of:

fixing the metal substrate 1 with jig or fixture in a box body filled with protective gas 3 (at least one of $N_2$, He, Ne, Ar, Kr, Xe, and Rn). In this embodiment, there is no specific limit to the box body as long as it is effective to prevent harm caused by laser radiation.

forming through grooves 5 in the metal substrate 1 by perpendicular laser irradiating the metal substrate 1 using YGA metal laser cutting machine. In this embodiment, the irradiating is performed under the following conditions: laser power of about 10 to 30 W; laser pulse width of at least 10 ns; and laser wave length of about 760 nm to about 1064 nm. The metal substrate 1 is at least one of Fe, Mg and Al or alloy thereof. The through groove has a width of about 0.2 to 0.4 mm, a depth of about 0.4 to 0.6 mm, and a spacing distance of about 0.6 to 0.8 mm.

coating at least a part of the surface of the metal substrate 1 with the melt composition 4 which has a thickness of about 100 to 1000 microns. In this embodiment, the melt composition 4 comprises quartz sand with an average diameter of 100 to 1000 microns and a metal base powder has an average diameter of about 10 to about 80 microns. Based on total weight of the melt composition 4, the quartz sand has a content of about 35 to 45 wt %, the metal base powder has a content of about 55 to 65 wt %, and $SiO_2$ content of the quartz sand may be 90 to 99 wt %.

after passing the protective gas 3 (at least one of $N_2$, He, Ne, Ar, Kr, Xe, and Rn) into the box slowly, joining the metal substrate 1 with the melt composition 4 by perpendicular laser irradiating the melt composition 4 between neighboring grooves 5, and cooling to room temperature. In this embodiment, the laser irradiating is performed under the following conditions: laser power of about 10 to 30 W, laser pulse width of at least 10 ns, and laser wave length of about 760 nm to about 1064 nm.

removing the melt composition 4 not joining with the metal substrate 1 by using a dust removal air gun or a brush, to obtain a metal body 6.

injection molding plastic on the surface of the metal body 6, to obtain the metal-plastic composite 7. In this embodiment, the method of injection molding may be point into the plastic.

According to a third aspect of present disclosure, there is provided a metal-plastic composite obtainable by the method described above. According to embodiments of present disclosure, the resulting metal-plastic composite may achieve an adhesion force of up to about 15 to about 25 MPa.

EXAMPLE

In the following examples and comparative examples, the box body was made of stainless steel, the metal substrate 1 and metal base power were Aluminum alloys 6063, the quartz sand was purchased from Beijing Ming Jian Technology Co., Ltd., PPS (polyphenylene sulfide) was A350, and purchased from Toray Industries, Inc, and the laser was provided by metal laser cutting machine (YGA20) purchased from HAN'S LASER TECHNOLOGY CO., LTD. Determination of adhesion force was performed according to GB5210-85 determination.

In the following examples and comparative examples, the injection molding was performed with the following steps: the metal body 6 was placed in a injection mold, and 100 g melt PPS with temperature of 310° C. was injected on the surface of the metal body, the resulting composite was maintained for 2 seconds under the pressure of 500 kg/m2 and cooled for 20 seconds, and the metal-plastic composite was obtained.

Example 1

This example was for instruction of the method for producing the metal-plastic composite of present disclosure.

(1) The metal substrate 1 was fixed in a box body filled with $N_2$ with jig or fixture, and then through grooves 5 with a width of 0.3 mm, a depth of 0.5 mm and a spacing distance of 0.7 mm, were formed in the metal substrate by perpendicular laser irradiating the metal substrate using YGA metal laser cutting machine. The laser irradiating was performed under the following conditions: laser power of 10 W; laser pulse width of 10 ns; and laser wave length of 760 nm.

(2) The melt composition was coated on the entire surface of the metal substrate with a thickness of 100 microns, the metal substrate was fixed with fixture one more time, perpendicular laser irradiated the melt composition between neighboring grooves to join the metal substrate with the melt composition after $N_2$ was passed into the box body slowly, the resulting composite was cooled to room temperature, the melt composition not joining with the metal substrate was removed by using a dust removal air gun or a brush, and a metal body was obtained. The laser irradiating was performed under the following conditions: laser power of 10 W; laser pulse width of 10 ns; and laser wave length of 760 nm. The melt composition comprises quartz sand with an average diameter of 100 microns and a metal base powder with an average diameter of 50 microns, and based on total weight of the melt composition, the quartz sand had a content of about 40 wt %, the metal base powder had a content of 60 wt %, and $SiO_2$ content of the quartz sand was 90 wt %.

(3) Plastic was injected on the surface of the metal body, and then the metal-plastic composite was obtained. The adhesion force between the metal substrate and plastic of the resulting metal-plastic composite was 18 MPa.

Example 2

This example was for instruction of the method for producing the metal-plastic composite of present disclosure.

(1) The metal substrate 1 was fixed in a box body filled with Ne with jig or fixture, and then through grooves 5 with a width of 0.2 mm, a depth of 0.4 mm and a spacing distance of 0.6 mm, were formed in the metal substrate by perpendicular laser irradiating the metal substrate using YGA metal laser cutting machine. The laser irradiating was performed under the following conditions: laser power of 20 W; laser pulse width of 20 ns; and laser wave length of 900 nm.

(2) The melt composition was coated on the entire surface of the metal substrate with a thickness of 500 microns, the metal substrate was fixed with fixture one more time, perpendicular laser irradiated the melt composition between neighboring grooves to join the metal substrate with the melt composition after Ne was passed into the box body slowly, the resulting composite was cooled to room temperature, the melt composition not joining with the metal substrate was removed using a dust removal air gun or a brush, and a metal body was obtained. The laser irradiating was performed under the following conditions: laser power of 20 W; laser pulse width of 20 ns; and laser wave length of 900 nm. The melt composition comprises quartz sand with an average diameter of 100 microns and a metal base powder with an average diameter of 30 microns, and based on total weight of the melt composition, the quartz sand had a content of about 35 wt %, the metal base powder had a content of 55 wt %, and $SiO_2$ content of the quartz sand was 95 wt %.

(3) Plastic was injected on the surface of the metal body, and then the metal-plastic composite was obtained.

The adhesion force between the metal substrate and plastic of the resulting metal-plastic composite was 20 MPa.

Example 3

This example was for instruction of the method for producing the metal-plastic composite of present disclosure.

(1) The metal substrate 1 was fixed in a box body filled with Ar with jig or fixture, and then through grooves 5 with a width of 0.4 mm, a depth of 0.6 mm and a spacing distance of 0.8 mm, were formed in the metal substrate by perpendicular laser irradiating the metal substrate using YGA metal laser cutting machine. The laser irradiating was performed under the following conditions: laser power of 30 W; laser pulse width of 30 ns; and laser wave length of 1064 nm.

(2) The melt composition was coated on the entire surface of the metal substrate with a thickness of 1000 microns, the metal substrate was fixed with fixture one more time, perpendicular laser irradiated the melt composition between neighboring grooves to join the metal substrate with the melt composition after Ar was passed into the box body slowly, the resulting composite was cooled to room temperature, the melt composition not joining with the metal substrate was removed by using a dust removal air gun or a brush, and a metal body was obtained. The laser irradiating was performed under the following condition: laser power of 30 W; laser pulse width of 30 ns; and laser wave length of 1064 nm.

The melt composition comprises quartz sand with an average diameter of 100 microns and a metal base powder with an average diameter of 60 microns, and based on total weight of the melt composition, the quartz sand had a content of about 45 wt %, the metal base powder had a content of 65 wt %, and $SiO_2$ content of the quartz sand was 99 wt %.

(3) Plastic was injected on the surface of the metal body, and then the metal-plastic composite was obtained. The adhesion force between the metal substrate and plastic of the resulting metal-plastic composite was 25 MPa.

Example 4

This example was for instruction of the method for producing the metal-plastic composite of present disclosure.

The metal-plastic composite was prepared according to the method of example 1, the differences were that:

Based on total weight of the melt composition, $SiO_2$ had a content of about 30 wt %, the metal base powder had a content of 50 wt %, and the adhesion force between the metal substrate and plastic of the resulting metal-plastic composite was 15 MPa.

Example 5

This example was for instruction of the method for producing the metal-plastic composite of present disclosure.

The metal-plastic composite was prepared according to the method of example 1, the differences were that: the average diameter of the metal base powder was 10 microns, and the adhesion force between the metal substrate and plastic of the resulting metal-plastic composite was 15 MPa.

Example 6

This example was for instruction of the method for producing the metal-plastic composite of present disclosure.

The metal-plastic composite was prepared according to the method of example 1, the differences were that: the through grooves had a width of 0.1 mm, a depth of 0.7 mm and a spacing distance of 0.2 mm, and the adhesion force between the metal substrate and plastic of the resulting metal-plastic composite was 15 MPa.

Comparative Example 1

The metal-plastic composite was prepared according to the method of example 1, and the differences were that: there was no melt composition coated on the surface of the metal substrate, and the adhesion force between the metal substrate and plastic of the resulting metal-plastic composite was 10 MPa.

Comparative Example 2

The metal-plastic composite was prepared according to the method of example 1, the differences were that: there were no through grooves formed in the surface of the metal substrate, and the adhesion force between the metal substrate and plastic of the resulting metal-plastic composite was 13 MPa.

Compared with the examples 1 to 7 and the comparative examples 1 to 2, it was obvious that the method of present disclosure was easy to process with low cost, and the metal-plastic composite had high adhesion force between the metal substrate and plastic.

Compared with the example 1 and the example 4, it was noticed that when based on total weight of the melt composition, $SiO_2$ had a content of about 35 to 40 wt %, the metal base powder had a content of about 55 to 65 wt %, the adhesion force between the metal substrate and plastic might be further improved.

Compared with the example 1 and the example 5, it was noticed that when metal base powder had an average diameter of about 30 to 60 microns, the adhesion force between the metal substrate and plastic might be further improved.

Compared with the example 1 and the example 6, it was noticed that when the thickness of the melt composition was about 100 to 1000 microns, the adhesion force between the metal substrate and plastic might be further improved.

Compared with the example 1 and the example 7, it was noticed that when the through grooves 5 had a width of about 0.2 to 0.4 mm, a depth of about 0.4 to 0.6 mm and a spacing distance of 0.6 to 0.8 mm, the adhesion force between the metal substrate and plastic might be further improved.

The method of present disclosure is easy to process with low cost, and the resulting metal-plastic composite may achieve an adhesion force of up to about 15 to about 25 MPa, demonstrating a high joining strength between the metal substrate and plastic.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A metal-plastic composite, comprising:
   a metal substrate; and
   a plastic body jointed to the metal substrate via a dual-snap-fit structure, wherein the dual-snap-fit structure comprises:
   a micro-snap-fit structure formed by laser-cladding a melt composition on the metal substrate; and
   a macro-snap-fit structure comprising a groove on the metal substrate, at least one micro-snap-fit structure and a surface of the metal substrate.

2. The metal-plastic composite of claim 1, wherein a groove is formed on the surface of the metal substrate, and the macro-snap-fit structure is formed by the micro-snap-fit structure and the groove.

3. The metal-plastic composite of claim 2, wherein the groove is configured as a through groove.

4. The metal-plastic composite of claim 3, wherein the through groove has a width of about 0.1 to 0.5 mm.

5. The metal-plastic composite of claim 3, wherein the through groove has a width of about 0.2 to 0.4 mm.

6. The metal-plastic composite of claim 3, wherein the through groove has a depth of about 0.3 to 0.7 mm.

7. The metal-plastic composite of claim 3, wherein the through groove has a depth of about 0.4 to 0.6 mm.

8. The metal-plastic composite of claim 3, wherein multiple through grooves are formed on the surface of the metal substrate, and the through grooves have a spacing distance of about 0.5 to 1.0 mm.

9. The metal-plastic composite of claim 3, wherein multiple through grooves are formed on the surface of the metal substrate, and the through grooves have a spacing distance of about 0.6 to 0.8 mm.

10. The metal-plastic composite of claim 1, wherein the micro-snap-fit structure is configured as a hook-structure formed by laser-cladding the melt composition on the metal substrate.

11. The metal-plastic composite of claim 10, wherein the melt composition comprising $SiO_2$ and a metal base powder.

12. The metal-plastic composite of claim 11, wherein based on total weight of the melt composition, $SiO_2$ has a content of about 30 to 50 wt %.

13. The metal-plastic composite of claim 11, wherein based on total weight of the melt composition, $SiO_2$ has a content of about 35 to 45 wt %.

14. The metal-plastic composite of claim 11, wherein based on total weight of the melt composition, the metal base powder has a content of about 50 to 70 wt %.

15. The metal-plastic composite of claim 11, wherein based on total weight of the cladding melt composition, the metal base powder has a content of about 55 to 65 wt %.

16. The metal-plastic composite of claim 11, wherein the metal base powder has an average diameter of about 10 to about 80 microns.

17. The metal-plastic composite of claim 11, wherein the metal base powder has an average diameter of about 30 to about 60 microns.

18. The metal-plastic composite of claim 11, wherein the micro-snap-fit structure has a thickness of 100-1000 microns.

\* \* \* \* \*